(No Model.)
A. F. MOLITOR.
FASTENING FOR SPRING TOOTH HARROWS.
No. 483,852. Patented Oct. 4, 1892.
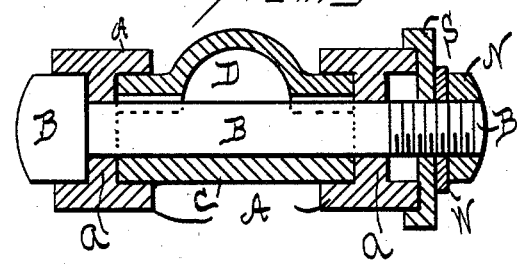
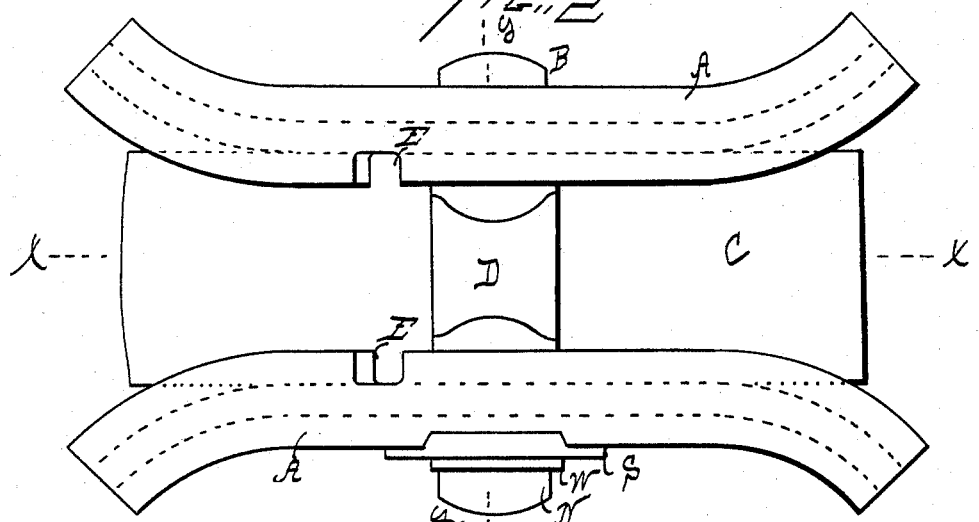

UNITED STATES PATENT OFFICE.

AARON F. MOLITOR, OF LANSING, MICHIGAN, ASSIGNOR TO E. BEMENT & SONS, OF SAME PLACE.

FASTENING FOR SPRING-TOOTH HARROWS.

SPECIFICATION forming part of Letters Patent No. 483,852, dated October 4, 1892.

Application filed May 26, 1892. Serial No. 432,073. (No model.)

*To all whom it may concern:*

Be it known that I, AARON F. MOLITOR, of Lansing, in the county of Ingham and State of Michigan, have invented a new and useful Improvement in Fastenings for Spring-Tooth Harrows, of which the following is a specification.

My invention consists in an improvement in fastenings for spring-tooth harrows or cultivators hereinafter fully described and claimed.

Figure 1 is a top plan view of a portion of two frame-bars with a section of tooth engaged therewith. Fig. 2 is a longitudinal section on line $x\ x$, Fig. 1; and Fig. 3 is a cross-section on $y\ y$, Fig. 1.

My invention relates to that class of harrows in which the frame is made of iron or steel channel-bars between which the teeth are fastened, and A A represent two sections of those portions of the frame which approach each other for the purpose of holding the teeth, it being well understood by persons skilled in the art that the channel-bars composing these frames are bent so as to make approximately a series of diamonds, at the corners of which the teeth are secured.

The common mode of securing a tooth (represented by C) is to place its shank between two channel-bars A A, with its convex portion resting on the lower flanges of said bars, and then to draw the channel-bars A A together by means of the bolt B and nut N, which bolt passes over the concave side of the tooth. The objection to this fastening is that the action of the bolts tends to draw the upper edges of the channel-bars A A together, there being nothing above bolt B to counteract tooth C below said bolt. It has been proposed to remedy this difficulty by placing a block of metal between said channel-bars above bolt B; but unless the channel-bars and teeth are made more accurately than is usual in this class of construction such an expedient rarely holds the upper edges of the channel-bars A exactly as far apart as the tooth C holds the lower edges, and therefore the channel-bars A have a tendency to tilt either at their upper or lower edges. I obviate this difficulty by inserting between said channel-bars and over bolt B a stop-piece D, usually made of steel, and which I make of such shape that it will have a slight spring, and thereby accommodate itself under all conditions to the width of the tooth C. The form in which I have made such stop-piece is that illustrated in Fig. 3, in which the center is curved up to afford a spring, while the ends are horizontal and slightly curved to fit the bolt; but this construction may be departed from in any way, so long as the piece D remains a spring.

For convenience in inserting the piece D after the tooth is in position I may make notches E in the upper flange of the channel-bars A, as shown in Figs. 1 and 2.

In using my invention the tooth C is inserted between the two channel-bars A, the bolt B passed through said channel-bars, a large washer S and small washer W slipped over the ends of said bolt, and the nut N put in position and screwed up until the channel-bars firmly compress tooth C between them, the spring D yielding slightly to permit this action.

What I claim as my invention, and desire to secure by Letters Patent, is—

The combination, with a harrow-frame consisting of channel-bars, of a spring-tooth confined between said channel-bars, means for drawing said channel-bars together, and a spring-stop between said channel-bars, substantially as shown and described.

AARON F. MOLITOR.

Witnesses:
L. O. E. IHLE,
L. M. GLEASON.